United States Patent
Seminara et al.

(10) Patent No.: US 9,431,905 B2
(45) Date of Patent: Aug. 30, 2016

(54) MULTIPHASE BUCK CONVERTER AND MULTIPHASE BUCK CONVERSION METHOD

(71) Applicant: ST-Ericsson SA, Plan-les-Ouates (CH)

(72) Inventors: Maria Francesca Seminara, Catania (IT); Patrizia Milazzo, S. Agrate Li Battiati (IT); Salvatore Rosario Musumeci, Catania (IT)

(73) Assignee: ST-ERICSSON SA, Plan-les-Ouates (CH)

( * ) Notice: Subject to any disclaimer, the term of this patent is extended or adjusted under 35 U.S.C. 154(b) by 172 days.

(21) Appl. No.: 14/362,428

(22) PCT Filed: Feb. 25, 2013

(86) PCT No.: PCT/EP2013/053744
§ 371 (c)(1),
(2) Date: Jun. 3, 2014

(87) PCT Pub. No.: WO2013/127750
PCT Pub. Date: Sep. 6, 2013

(65) Prior Publication Data
US 2015/0022533 A1    Jan. 22, 2015

Related U.S. Application Data

(60) Provisional application No. 61/616,522, filed on Mar. 28, 2012.

(30) Foreign Application Priority Data

Feb. 28, 2012  (EP) .................................... 12425045

(51) Int. Cl.
*H02M 1/084*  (2006.01)
*H02M 3/158*  (2006.01)
(Continued)

(52) U.S. Cl.
CPC ............ H02M 3/1584 (2013.01); G06F 1/325 (2013.01); *H02M 2001/0009* (2013.01)

(58) Field of Classification Search
CPC ... H02M 1/084; H02M 1/088; H02M 3/1584
USPC .............................................. 323/272, 282
See application file for complete search history.

(56) References Cited

U.S. PATENT DOCUMENTS 6,292,378 B1  9/2001  Brooks et al.
2005/0225307 A1  10/2005  Sato et al.
(Continued)

OTHER PUBLICATIONS

International Search Report issued in corresponding International application No. PCT/EP2013/053744, date of mailing Aug. 21, 2013.
(Continued)

*Primary Examiner* — Jeffrey Sterrett
(74) *Attorney, Agent, or Firm* — Patent Portfolio Builders PLLC

(57) ABSTRACT

A multiphase buck converter (10) is disclosed, comprising: —a first buck converter branch (SD1, L1) comprising a first core section (COR1), a first power section (PWR1) having a first output node (LX1), a first coil (11) having a first end connected to the first output node (LX1), the first power section (PWR1) being adapted to be controlled by the first core section (COR1) for providing to the coil (L1) a coil current (I1), the first core section (COR1) and the first power section (PWR1) being integrated in a chip (IC); —a second buck converter branch (SD2, L2) comprising a second core section (COR2), a second power section (PWR2) having a second output node (LX2), a second coil (L2) having a first end connected to the second output node (LX2), the second power section (PWR2) being adapted to be controlled by the second core section (COR2) for providing to the second coil (L2) a second coil current (I2), the second core section (COR2) and the second power section (PWR2) being integrated in said chip (IC); —a feedback loop adapted to balance said coil currents (I1,I2). The feedback loop comprises a control block (C_B) that, in order to balance said coil currents, is adapted to compare a first average voltage at the first output node (LX1) with a second average voltage at the second output node (LX2) and control the first (SD1, L1) and second branch (SD2, L2) in order to make said first and second average voltages equal to each other. The control block (C_B) is integrated in said chip (IC) and has a first input directly connected to said first output node (LX1) and a second input directly connected to said second output node (LX2). The control block (C_B) is adapted to directly obtain said first and second average voltages from the instantaneous voltages of the first (LX1) and second (LX2) output nodes.

10 Claims, 5 Drawing Sheets

(51) Int. Cl.
*G06F 1/32* (2006.01)
*H02M 1/00* (2006.01)

(56) References Cited

U.S. PATENT DOCUMENTS

2008/0238390 A1* 10/2008 Trivedi ............... H02M 3/1584
           323/283
2009/0167080 A1    7/2009 Carpenter et al.

2015/0022533 A1* 1/2015 Seminara ............ H02M 3/1584
           345/501

OTHER PUBLICATIONS

Extended European Search Report issued in corresponding European application No. EP 12 42 5045, date of completion Oct. 31, 2012.

* cited by examiner

MULTIPHASE BUCK CONVERTER AND MULTIPHASE BUCK CONVERSION METHOD

TECHNICAL FIELD

The present disclosure relates to the field of the buck converters and more in particular concerns a multiphase buck converter and a multiphase buck conversion method.

BACKGROUND ART

Modern graphics processors (GFX) and application processors (AP) require ever increasing power supplies in order to operate at high switching frequencies. Such graphics processors and application processors are for example widely used in smartphones and tablet PCs. In a digital platform of a smartphone or a tablet PC it is well known to provide a power management unit (PMU) adapted to supply, among others circuits, the graphic processor and the application processor. It is also well known to provide one or more buck converters inside the PMU. In general, multiphase buck converters are preferred with respect to single-phase buck converters, since multiphase buck converters show advantages such as a reduced ripple in the output current and a faster response to load changes.

An example of multiphase buck converter is schematically shown in FIG. 1. A multiphase buck converter 1 generally comprises two or more single-phase buck converter branches SD1,L1 and SD2,L2 connected in parallel between a common input node 13 and a common output node 15. The output node 15 is the node intended to be connected to the load 5 to be supplied with the output supply voltage Vout of the buck converter 1. As it is known, each of the two or more buck converter branches comprises a coil L1, L2. Moreover in general, each of the buck converter branches SD1,L1 and SD2,L2 comprises a core section and a power section. The power section is provided for driving the respective coil L1, L2 with a coil current I1, I2, while the core section is adapted to control the power section. According to a known architecture, each of the power sections comprises a so called upper switch and a so called lower switch, both controlled by the core section.

An important issue in a multiphase buck converter is the balancing of the coil currents I1, I2 of the different buck converter branches. Such coil currents I1, I2 can be for example unbalanced due to the spread of process parameters among the electronic components of the different single-phase buck converter stages.

Since current balancing is an important issue in multiphase buck converters, it is known to provide within multiphase buck converters a control loop adapted to balance the coil currents among the different single phase branches. A possible control mode implemented by the control loop is based on the sensing the currents of the coils. There are several different known ways for sensing the currents of the coils, namely:

Sensing the voltage signal across the coils;
Sensing the voltage over the lower switch of the power section;
Sensing the voltage over a small resistor inserted in series to the coil;
Sensing the voltage over the upper switch of the power section.

In general, the known methods and arrangements for balancing coils currents in a multiphase buck converter require a significant increase in the number of components due to the additional components, in general external components, needed for sensing the currents and therefore an increase in terms of costs and design complexity of the overall circuit. An example of prior art multiphase buck converter requiring external components is disclosed in U.S. Pat. No. 6,292,378, in particular an external RC low pass filter for each of the different buck converter branches.

SUMMARY OF THE INVENTION

It is an object of the present invention to provide a multiphase buck converter that, with respect to multiphase converter of the prior art, is adapted to guarantee good performances in terms of coil currents balancing with a reduced increase of the costs and design complexity.

The above object is reached by a multiphase buck converter comprising:
a first buck converter branch comprising a first core section, a first power section having a first output node (LX1), a first coil having a first end connected to the first output node, the first power section being adapted to be controlled by the first core section for providing to the first coil a first coil current, the first core section and the first power section being integrated in a chip;
a second buck converter branch comprising a second core section, a second power section having a second output node, a second coil having a first end connected to the second output node, the second power section being adapted to be controlled by the second core section for providing to the second coil a second coil current, the second core section and the second power section being integrated in said chip;
a feedback loop adapted to balance said coil currents.

The feedback loop comprises a control block that, in order to balance the coil currents, is adapted to compare a first average voltage at the first output node with a second average voltage at the second output node and control the first and second branch in order to make said first and second average voltages equal to each other.

The control block is integrated in said chip and has a first input directly connected to said first output node and a second input directly connected to said second output node, and wherein the control block is adapted to directly obtain said first and second average voltages from the instantaneous voltages of the first and second output nodes.

The above object is also reached by multiphase buck conversion method, comprising the steps of:
providing a first buck converter branch having first coil and a first output node connected to one end of said first coil and providing a first coil current to said first coil;
providing a second buck converter branch having second coil and a second output node connected to one end of said second coil and providing second coil current to said second coil.

The multiphase buck conversion method comprises also a step of balancing said coil currents with a feedback control, the balancing step comprising comparing a first average voltage at the first output node with a second average voltage at the second output node and controlling the first and second branch in order to make said first and second average voltages equal to each other. The method further comprises a step of directly reading instantaneous voltages at the output nodes.

BRIEF DESCRIPTION OF THE DRAWINGS

Further features and advantages of the present invention will become more apparent from the following detailed description of exemplary but non-limiting embodiments thereof, as illustrated in the attached figures, in which.

DETAILED DESCRIPTION

In the attached figures similar or identical elements are indicated using the same reference numbers.

Figure 1:
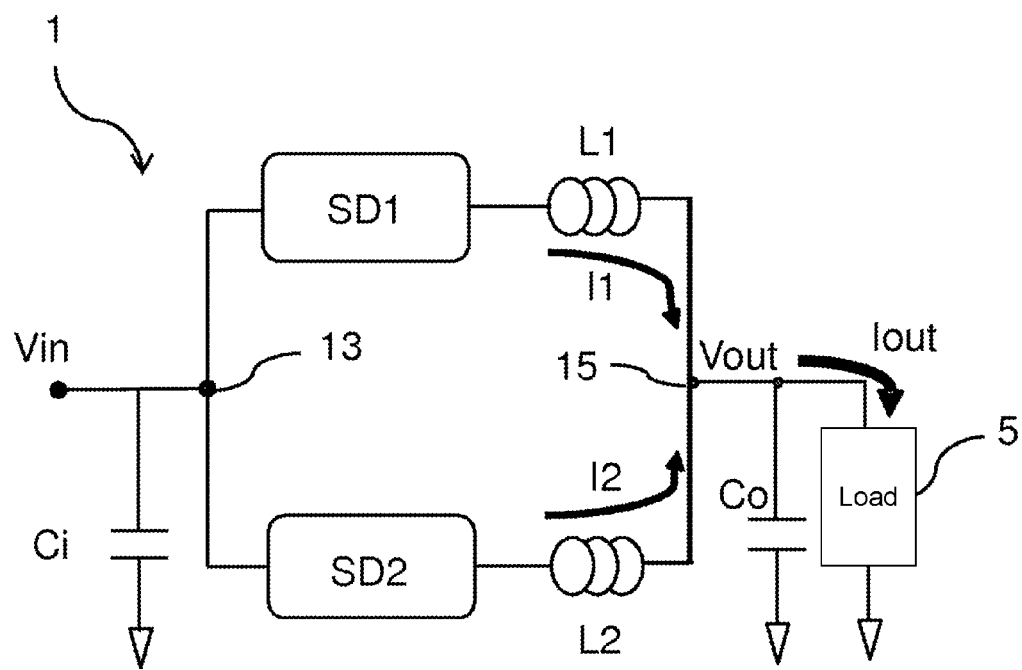
FIG. 1 shows a very schematic view of known multiphase buck converter.
Figure 2:
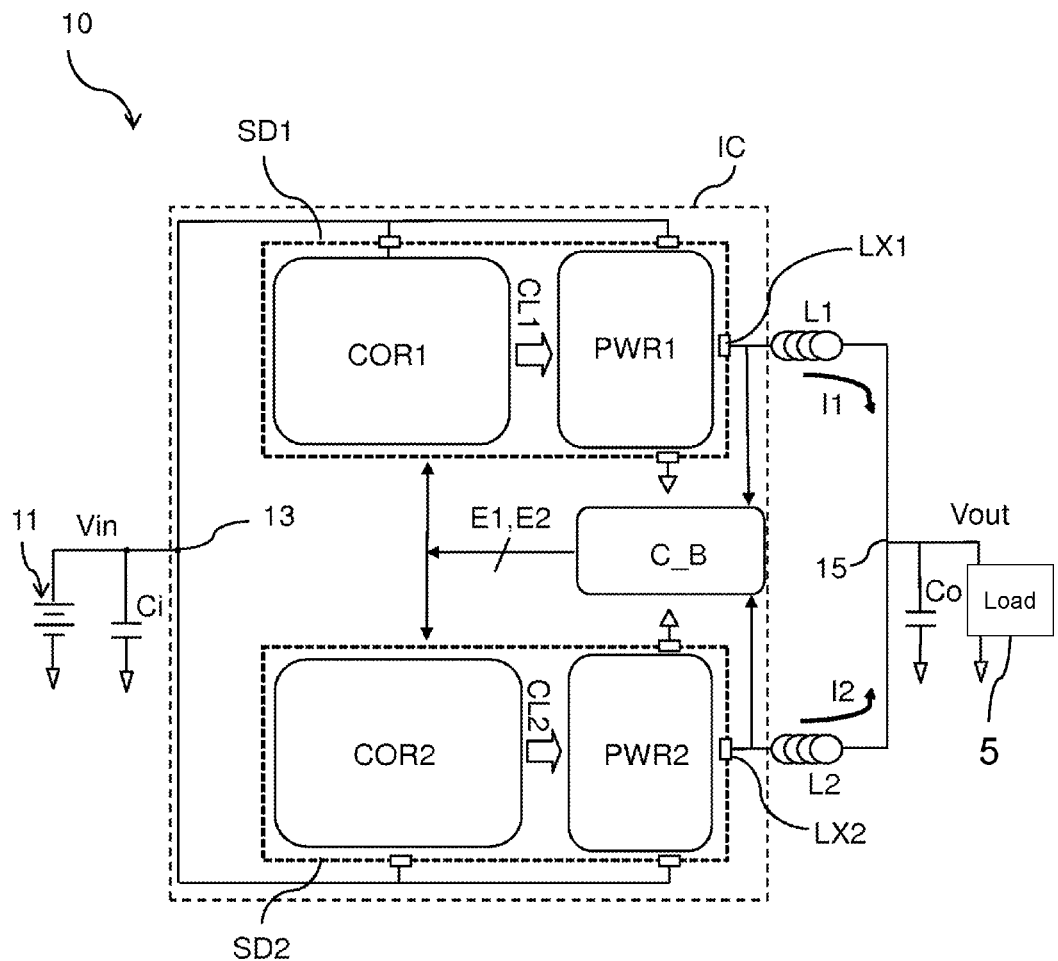
FIG. 2 shows a schematic block diagram of an embodiment of a multiphase buck converter.

FIG. 2 shows a general block diagram of an embodiment of a multiphase buck converter 10. In this case, without introducing any limitation, the buck converter 10 is a two-phases buck converter.

According to an embodiment the multiphase buck converter is comprised in a power management unit (PMU) for an application and/or graphic processor for example of a digital platform of a mobile phone or a tablet PC.

The multiphase buck converter 10 comprises a first buck converter branch SD1,L1, namely the upper branch in FIG. 2, comprising a first core section COR1, a first power section PWR1 having a first output node LX1, a first coil L1 having a first end connected to the first output node LX1. The first core section COR1 and the first power section PWR are integrated in a chip IC. The first power section PWR1 is adapted to be controlled by the first core section COR1 for providing to the first coil L1 a first coil current I1. In the example shown, the first core section COR1 is adapted to control the first power section PWR1 by means of a first control signal CL1. Said first control signal CL1 is a PWM (Pulse Width Modulated) signal.

The multiphase buck converter 10 comprises a second buck converter branch SD2, L2, namely the lower branch in FIG. 2, comprising a second core section COR2, a second power section PWR2 having a second output node LX2, a second coil L2 having a first end connected to the second output node LX2. The second core section COR2 and the second power section PWR2 are integrated within the same chip IC in which the first core section COR1 and the first power section PWR1 are integrated, while the first and second coils L1 and L2 are generally external with respect said chip. The second power section PWR2 is adapted to be controlled by the second core section COR2 for providing to the second coil L2 a second coil current I2. In the example shown, the second core section COR2 is adapted to control the second power section PWR2 by means of a second control signal CL2. Said second control signal CL2 is a PWM (Pulse Width Modulated) signal.

The second ends of the first and the second coil L1, L2 are connected to a common output node 15 connected to a load 5 intended to be fed with a DC output voltage Vout, which represents the DC output voltage of the multiphase buck converter 10. The first and second core sections COR1 and COR2 are adapted to control the respective power sections PWR1 and PWR2 in such a way that the output voltage Vout at the common output node 15 equals a desired voltage, for example a reference voltage Vref generated within the multiphase buck converter 10. For this purpose, the multiphase buck converter 10 comprises a PWM based continuous voltage loop not shown in FIG. 2, adapted to compare the output voltage Vout with the desired voltage Vref and to output, through the first and second core sections COR1, COR2, the first and the second PWM control signal CL1, CL2 provided for controlling respectively the first power section PWR1 and the second power section PWR2.

In the particular example shown, the first and second buck converter branches are connected in parallel to each other between a common input node 13 and the common output node 15. The common input node 13 is fed with a DC input voltage Vin, for example supplied by an external battery 11. The multiphase buck converter 10 comprises an input capacitor Ci, having a first side connected to the common input node 13 and a second side connected to ground. The multiphase buck converter 10 comprises an output capacitor Co, having a first side connected to the common output node 15 and a second side connected to ground.

Since coil currents I1, I2 can be for example unbalanced due to the spread of process parameters among the electronic components of the first buck converter branch SD1, L1 and of the second buck converter branch SD2, L2, the multiphase buck converter 10 comprises a feedback loop adapted to balance the coil currents I1,I2.

The feedback loop comprises a control block C_B integrated within the same chip IC in which the first and second core sections and the first and second power sections are integrated. Said control block C_B, in order to balance the coil currents I1, I2, is adapted to compare a first average voltage at the first output node LX1 with a second average voltage at the second output node LX2 and control the first SD1, L1 and the second branch SD2, L2 in order to make said first and second average voltages equal to each other. It is possible to demonstrate that if the above condition is met, then the first coil current I1 and the second coil current I2 are balanced. In fact, assuming that:

the first and second coils L1, L2 have a same inductance value; and
the first and second coils L1, L2 have a same equivalent series resistance ESR;

And indicating as:
VLX1 the average voltage at the output node LX1; and
VLX2 the average voltage at the output node LX2;
I1_AV the average of the first coil current I1;
I2_AV the average of the second coil current I1;
Since:

$$V\text{out}=I1\_AV*ESR+VLX1; \text{ and}$$

$$V\text{out}=I2\_AV*ESR+VLX2;$$

if VLX1=VLX2 than I1_AV=I2_AV, in other words the coil currents I1 and I2 are balanced.

According to an embodiment the control block C_B has a first input directly connected to the first output node LX1 and a second input directly connected to the second output node LX2 and is adapted to obtain said first and second average voltages from the instantaneous voltages of said first LX1 and second LX2 output nodes. According to an embodiment, said direct connections are connections integrated within the chip IC in which the first and second core sections and the first and second power sections and the control block C_B are integrated.

According to an embodiment, the control block C_B is adapted, based on the result of the comparison between the average voltages at the output nodes LX1 and LX2, to provide a differential error signal E1,E2 comprising a first error signal E1 and a second error signal E2. The first error signal E1 and the second error signal E2 are intended to control either directly or indirectly the first power section COR1 and the second power section COR2.

Figure 3:
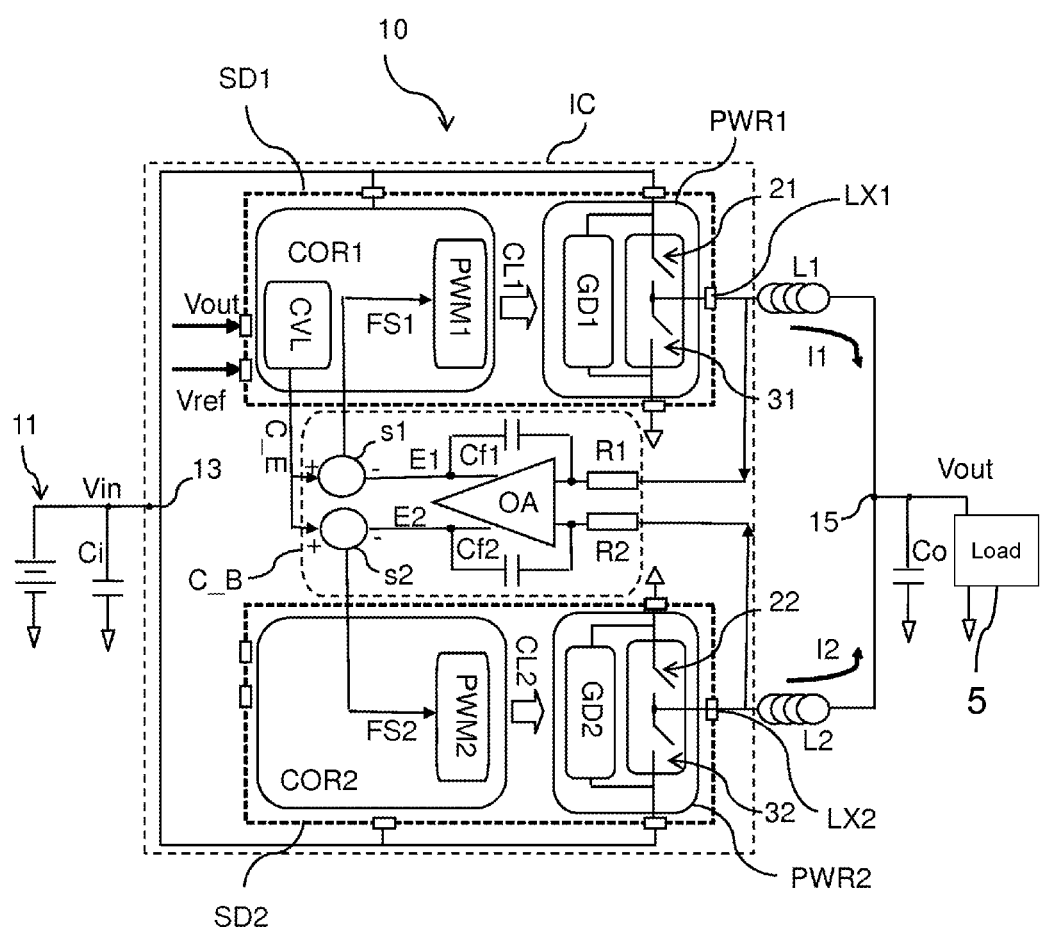
FIG. 3 shows a schematic block diagram of an example of possible embodiment of the multiphase buck converter of FIG. 2.

FIG. 3 schematically shows a particular embodiment of the multiphase buck converter of FIG. 2.

In the embodiment shown in FIG. 3, the control block C_B comprises an analog integrator circuit OA, R1, R2, Cf1, Cf2 comprising a differential operational amplifier OA, with a first integration path comprising an input resistor R1 and a feedback capacitor Cf1 and a second integration path comprising an input resistor R2 and a feedback capacitor Cf2.

The analog integrator circuit OA, R1, R2, Cf1, Cf2 has differential inputs and outputs, the differential inputs being respectively connected to the first and second output nodes LX1, LX2. The differential outputs are such to provide the differential error signal E1,E2.

According to a further embodiment, the first core section COR1 comprises a first PWM modulator PWM1 and the second core section COR2 comprises a second PWM modulator PWM2. The first and the second PWM modulators PWM1, PWM2 are respectively adapted to output the first and second control signals CL1 and CL2 for controlling the first PWR1 and the second PWR2 power sections respectively. The buck converter 10 includes a continuous voltage feedback loop CVL adapted to compare the output voltage Vout with the desired output voltage Vref and provide in response a common error signal C_E. Moreover, in the above embodiment, the control block C_B comprises:

- a first adder s1 adapted to receive as input the common error signal C_E and the first error signal E1 in order to provide as output a first feedback signal FS1 fed to the first core section COR1 and more in particular to the first PWM generator PWM1;
- a second adder s2 adapted to receive as input said common error signal C_E and said second error signal E2 in order to provide as output a second feedback signal FS2 fed to the second core section COR2 and in particular to the second PWM generator PWM2.

The first and second PWM modulators PWM1 and PWM2 are configured to compare the signals at the output of the adders S1, S2 with locally generated reference triangular waveforms in order to output the first and second control signals CL1 and CL2. The above mentioned reference triangular waveforms of the first and second buck converter branches have the same frequency, namely the switching frequency, but have between them a phase shift of 360/N. In the example shown N=2 because N is the number of phases and the example described refers to a two-phases buck converter 10.

According to an embodiment, the first power section PWR1 comprises a first gate driver GD1 an upper switch 21 and a lower switch 31. The first gate driver GD1 is controlled by the first control signal CL1, and is adapted to drive the upper and lower switches 21, 31. For example, such switches 21, 31 are MOSFET devices whose gates are driven by the gate driver GD1. The first output node LX1 is a node between the upper switch 21 and the lower switch 31. In a similar way, the second power section PWR2 comprises a second gate driver GD2 an upper switch 22 and a lower switch 32. The second gate driver GD2 is controlled by the second control signal CL2, and is adapted to drive the upper and lower switches 22, 32. For example, such switches 22, 32 are MOSFET devices whose gates are driven by the gate driver GD2. The second output node LX2 is a node between the upper switch 22 and the lower switch 32.

According to an embodiment, as shown in FIG. 3, the first adder s1 is adapted to provide the first feedback signal FS1 as the difference between the common error signal C_E and the first error signal E1 and the second adder s2 is adapted to provide the second feedback signal FS2 as the difference between the common error signal C_E and the second error signal E2.

Figure 4:
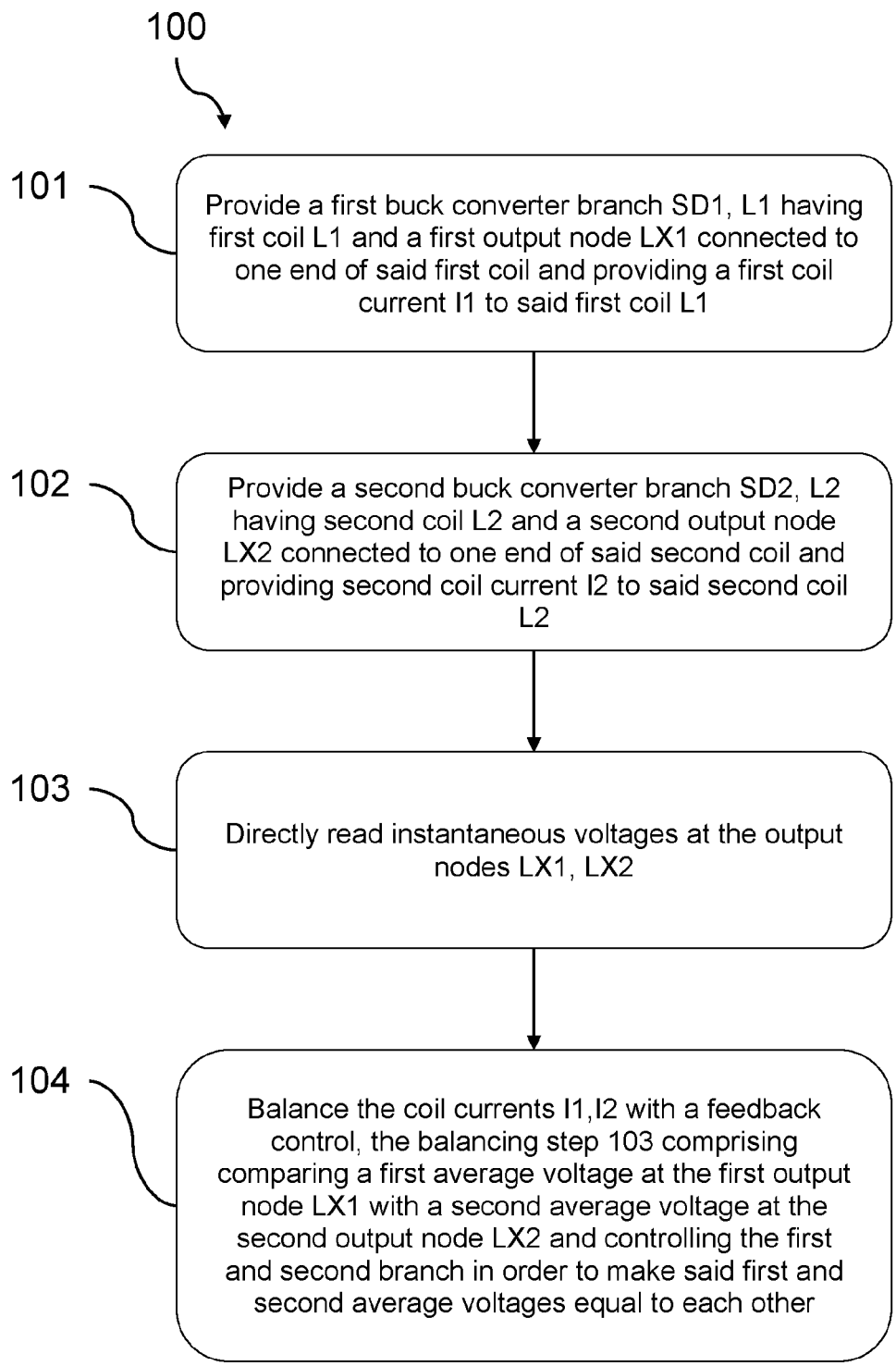
FIG. 4 shows a schematic flow chart buck conversion method that can be performed through the buck converter of FIG. 2 or 3.

FIG. 4 shows a simplified flow chart of a multiphase buck conversion method 100. The multiphase buck conversion method 100 comprises the steps of:

providing 101 a first buck converter branch SD1, L1 having first coil L1 and a first output node LX1 connected to one end of said first coil and providing a first coil current I1 to said first coil L1;

providing 102 a second buck converter branch SD2, L2 having second coil L2 and a second output node LX2 connected to one end of said second coil and providing second coil current I2 to said second coil L2;

balancing 104 said coil currents I1,I2 with a feedback control, the balancing step 103 comprising comparing a first average voltage at the first output node LX1 with a second average voltage at the second output node LX2 and controlling the first and second branch in order to make said first and second average voltages equal to each other.

According to an embodiment, the multiphase buck conversion method 100 comprises also a step 103 of directly reading instantaneous voltages at the output nodes LX1, LX2. According to an embodiment, the multiphase buck conversion method 100 comprises also a step of integrating with an analog integrator said instantaneous voltages in order to obtain said average voltages.

Further features and embodiments of the above described buck conversion method 100 can be derived directly by features and embodiments already detailed for the multiphase buck converter 10 described with reference to FIGS. 2 and 3.

Simulation results have proved that the above described multiphase buck converter and conversion method fully reach the proposed objectives.

It is to be observed that since the control block C_B directly reads the voltages of the output nodes LX1, LX2 and since the control block C_B is integrated within the same chip in which the first and second core sections and the first and second power section are integrated, no additional external components are needed in order to balance the coil currents I1, I2. According to the simulation and test results, the above disclosed multiphase buck converter and conversion method have shown good performance in terms of coil current balancing, in both the so called PSK (Pulse Keeping) mode at low load condition and PWM mode at high load condition.

Naturally, in order to satisfy contingent and specific requirements, a person skilled in the art may apply to the above-described multiphase buck converter and buck conversion method many modifications and variations, all of which, however, are included within the scope of protection of the invention as defined by the following claims.

Figure 5:
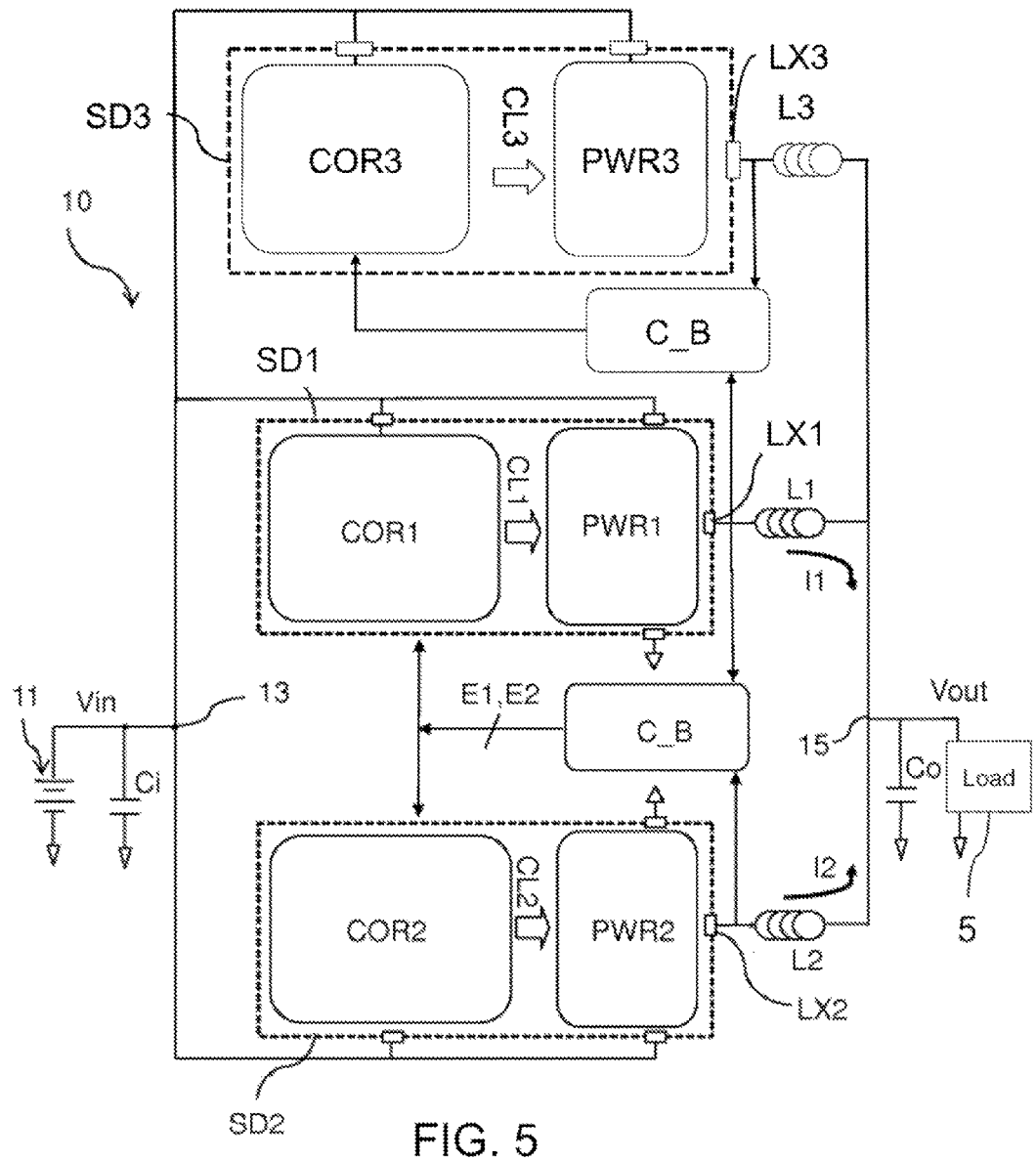
FIG. 5 shows a schematic block diagram of an embodiment of a multiphase buck converter with more than two branches.

For example, as illustrated in FIG. 5, the multiphase buck converter may comprise more than two branches. In such case, the first two branches will be arranged as above described, and both of them, or only one of them, may be used as masters for other branches. For example the first branch SD1 may be the master for a third branch (slave branch), and another control block C_B may be provided similar or identical to the one of FIG. 3, with two inputs one of which is connected to LX1 and the other one of which is connected to LX3 in the third branch, and wherein the correction signal is sent only to (or applied only to or produced only for) the third branch. It must be clear that, according to the above approach, each of the first or the second branches SD1, S2 may be the master of one or more slave branches.

The invention claimed is:

1. A multiphase buck converter comprising:
a first buck converter branch comprising a first core section, a first power section having a first output node, a first coil having a first end connected to the first output node, the first power section being adapted to be controlled by the first core section for providing to the first coil a first coil current, the first core section and the first power section being integrated in a chip;
a second buck converter branch comprising a second core section, a second power section having a second output node, a second coil having a first end connected to the second output node, the second power section being adapted to be controlled by the second core section for providing to the second coil a second coil current, the second core section and the second power section being integrated in said chip;
a feedback loop adapted to balance said coil currents; wherein:
the feedback loop comprises a control block that, in order to balance said coil currents, is adapted to compare a first average voltage at the first output node with a second average voltage at the second output node and control the first and second branch in order to make said first and second average voltages equal to each other; and
the control block is integrated in said chip and has a first input directly connected to said first output node and a second input directly connected to said second output node, and wherein the control block is adapted to directly obtain said first and second average voltages from the instantaneous voltages of the first and second output nodes, wherein the control block is adapted, based on the result of said comparison, to provide a differential error signal comprising a first error signal and a second error signal.

2. A multiphase buck converter according to claim 1, wherein the control block comprises an analog integrator circuit comprising a differential operational amplifier, said integrator circuit being adapted to obtain said first and second average voltages directly from the instantaneous voltages of the first and second output nodes.

3. A multiphase buck converter according to claim 1, wherein said converter comprises at least one further branch, and wherein one of said first and second branch or both of them, are adapted to act as masters for said at least one further branch.

4. A multiphase buck converter according to claim 1, wherein the analog integrator circuit has differential inputs and outputs, the differential inputs being respectively said first and second inputs and the differential outputs being such to provide said differential error signal.

5. A multiphase buck converter according to claim 4, wherein:
the first and the second branch are connected in parallel to each other between a common input node and common output node, the common output node being adapted to be connected to a load to be supplied with an output voltage of said buck converter;
the first core section comprises a first PWM modulator and the second core section comprises a second PWM modulator adapted to output control signals for controlling said first and second power sections respectively;
the buck converter includes a continuous voltage feedback loop adapted to compare said output voltage with a desired voltage and provide in response a common error signal;
the control block comprises a first adder adapted to receive as input said common error signal and said first error signal in order to provide as output a first feedback signal fed to the first PWM modulator; and
the control block comprises a second adder adapted to receive as input said common error signal and said second error signal in order to provide as output a second feedback signal fed to the second PWM modulator.

6. A multiphase buck converter according to claim 5, wherein:
the first adder is adapted to provide said first feedback signal as the difference between said common error signal and said first error signal;
said second adder is adapted to provide said second feedback signal as the difference between said common error signal and said second error signal.

7. A multiphase buck converter according to claim 1, wherein said direct connections are connections integrated within said chip.

8. A multiphase buck conversion method, comprising the steps of:
providing a first buck converter branch having first coil and a first output node connected to one end of said first coil and providing a first coil current to said first coil;
providing a second buck converter branch having second coil and a second output node connected to one end of said second coil and providing second coil current to said second coil;
balancing said coil currents with a feedback control, comprising comparing a first average voltage at the first output node with a second average voltage at the second output node to provide a differential error signal comprising a first error signal and a second error signal that controls the first and second branch in order to make said first and second average voltages equal to each other;
directly reading instantaneous voltages at the output nodes.

9. A multiphase buck conversion method according to claim 8, further comprising a step of integrating with an analog integrator said instantaneous voltages in order to obtain said average voltages.

10. A power management unit for an application and/or graphic processor, comprising a multiphase buck converter, which comprises
a first buck converter branch comprising a first core section, a first power section having a first output node, a first coil having a first end connected to the first output node, the first power section being adapted to be controlled by the first core section for providing to the first coil a first coil current, the first core section and the first power section being integrated in a chip;
a second buck converter branch comprising a second core section, a second power section having a second output node, a second coil having a first end connected to the second output node, the second power section being adapted to be controlled by the second core section for providing to the second coil a second coil current, the second core section and the second power section being integrated in said chip;

a feedback loop adapted to balance said coil currents; wherein:

the feedback loop comprises a control block that, in order to balance said coil currents, is adapted to compare a first average voltage at the first output node with a second average voltage at the second output node and control the first and second branch in order to make said first and second average voltages equal to each other; and the control block is integrated in said chip and has a first input directly connected to said first output node and a second input directly connected to said second output node, and wherein the control block is adapted to directly obtain said first and second average voltages from the instantaneous voltages of the first and second output nodes, wherein the control block is adapted, based on the result of said comparison, to provide a differential error signal comprising a first error signal and a second error signal.

* * * * *